April 1, 1930. D. L. JACOBSON 1,752,382
GAS PURIFICATION PROCESS
Filed Dec. 8, 1921
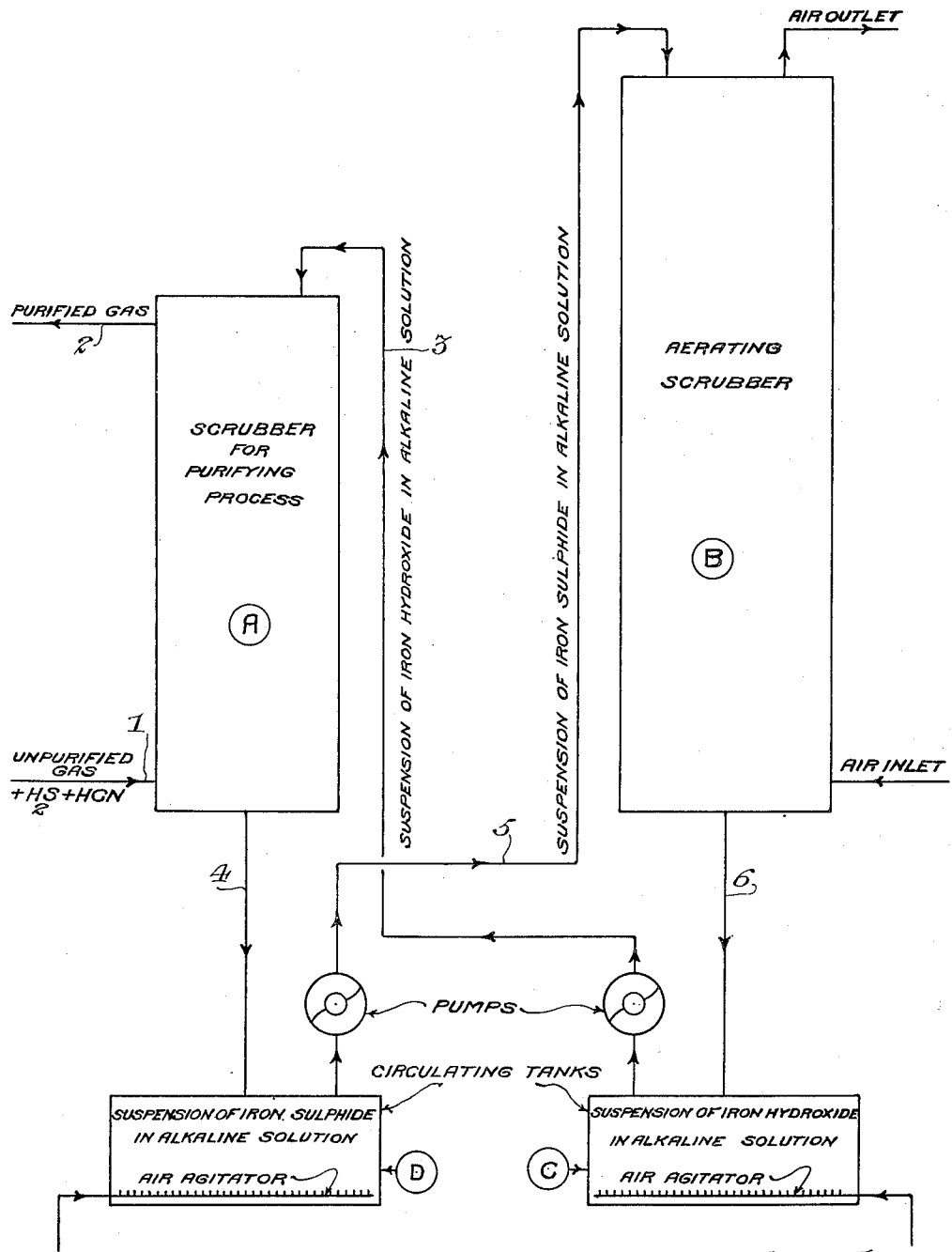

Patented Apr. 1, 1930

1,752,382

UNITED STATES PATENT OFFICE

DAVID L. JACOBSON, OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS-PURIFICATION PROCESS

Application filed December 8, 1921. Serial No. 520,786.

This invention relates to the removal of hydrogen sulphide and other noxious compounds, such as hydrocyanic acid, from gases containing them. Objects of the invention are to effect an efficient purification of the gases with an absorbent liquid which removes the noxious constituents combined with revivification of the absorbent liquid for further gas purification and disposal of substantially all the absorbed sulphur in a manner which avoids the escape of noxious fumes into the atmosphere in the vicinity of the gas purifying plant.

In addition to the general objects recited above, the invention has for further objects such other improvements or advantages in operation and results as are found to obtain in the processes hereinafter described or claimed.

In the accompanying drawing forming a part of this specification and showing, for purposes of exemplification a preferred form and manner in which the invention may be embodied and practiced, but without limiting the claimed invention specifically to such illustrative instance or instances:

The figure illustrates a diagrammatic representation of apparatus for carrying out the improved gas purifying process of the present invention.

In its present embodiment, the invention is applied to the purification of fuel gases, such as coke oven gas; for convenience, the present description will be confined to this use of the invention. Features of the invention are, however, readily susceptible of other valuable application; consequently, the scope of the invention is not confined to the specific use and specific embodiment herein described as an illustrative example.

In carrying out the invention, the gases, after the tar and ammonia have been removed, are brought into contact with a purifying solution constituted of dissolved non-volatile alkali, such as sodium carbonate or other soluble alkaline substances, the solution containing in suspension an iron compound having an affinity for the sulphur absorbed by the alkali, such as iron oxide. Various iron compounds may be employed for this purpose, as stated later, but in the present exemplification, reference is made to iron oxide only. The gases to be purified enter the bottom of the scrubber or washer A, through the gas line 1 and discharge from the top of said scrubber through the purified-gas line 2. The purifying solution is delivered to the top of the scrubber A through the solution line 3 and the solution containing the absorbed impurities discharges through the solution line 4. In the scrubber A, the gas is brought into contact with the purifying solution and the dissolved alkali absorbs the hydrogen sulphide and other noxious constituents of the gas forming soluble sulphide compounds. A further reaction takes place between the iron oxide and soluble sulphide compounds, with the result that iron sulphide forms and the soluble alkali is regenerated, the soluble alkali acting as a carrier of the hydrogen sulphide to the iron oxide that is converted to iron sulphide. Some of the iron oxide may also react directly with the hydrogen sulphide.

The solution containing the absorbed impurities is then pumped from the sump D through a line 5 and discharged into the top of a second scrubber or washer B, in which it is met by an ascending current of air. The air oxidizes the iron sulphides to iron oxide and free sulphur. Concurrently, any sodium hydrogen sulphide which has escaped the action of the iron will be decomposed by the sodium bicarbonate and any absorbed carbon dioxide will be expelled. Thus, all the absorbed gases are decomposed. The solution is thus regenerated or revivified for further purification of the gas; the cycle of washing the impurities out of the gas and aerating the solution containing the iron oxide in suspension may be made continuous, as shown in the attached diagram of the apparatus used in the process. The revivified solution discharges from the aerating scrubber B through the line 6 into a sump C from which it may be pumped through the line 3 into the purification scrubber A. The concentration of the iron oxide in suspension and of the dissolved alkali may be varied as desired; in practice, a one-half to one percent sodium carbonate solution, with two or three percent iron oxide suspended in it, will be found satisfactory. The suspension of iron oxide and iron sulphide in the alkaline solutions are stored in the sumps C and D, one, C, for the purification step, and the other, D, for the aerating step. In these sumps or tanks, air agitators or other agitating means may be provided. Preliminary agitation of the spent wash liquor accompanied by some regenerating aeration is conducted in the sump D and further regenerating aeration is effected in the scrubber B that effects the thorough and intimate contact of air with flowing liquor. The conversion of the iron sulphide to iron oxide and free sulphur, and other action of the air, may take place partly or even to a large extent, in these tanks.

The chemical reactions taking place in the purification scrubber may be exemplified by the following equations:

(a) Absorption of hydrogen sulphide by sodium carbonate.

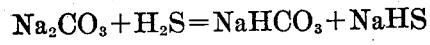

Carbon dioxide, if present, is also absorbed.

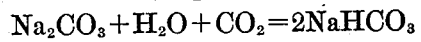

Direct absorption of hydrogen sulphide by iron oxide.

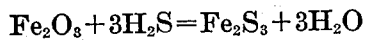

(b) Action of sodium hydrogen sulphide and sodium bicarbonate on iron oxide forming iron sulphide:

In the aerating steps, the chemical reactions are exemplified in the following equations:

(a) Oxidation of iron sulphide to iron oxide and free sulphur:

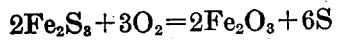

(b) Conversion of bicarbonate to carbonate:

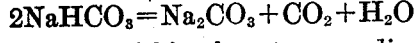

(c) Action of bicarbonate on sodium hydrogen sulphide:

In addition to these reactions, some of the soluble sulphide, such as sodium hydrogen sulphide, reacts with the free sulphur present and the air, resulting in a relatively rapid formation of sodium thiosulphate. The sodium thiosulphate may be allowed to accumulate in the solution, and can then be recovered by a suitable process, such as that described in the co-pending application for Letters Patent of the United States, of Ralph E. Hall and David L. Jacobson, filed April 18, 1921, Serial No. 462,136. Where a very rapid thiosulphate formation is not desired, such formation can be decreased by employing very dilute solutions, such as one-half percent sodium carbonate or less. A further advantage in using such weakly alkaline solutions is that the mechanical loss of dissolved alkali is thereby decreased, with the result that the process is made more economical. In the aerating step, very little or no hydrogen sulphide is carried off by the air, so there is no nuisance from this cause.

The free sulphur is allowed to accumulate in the suspension, part of the sludge being withdrawn at suitable times for recovery of the sulphur and iron oxide. From time to time, fresh iron hydroxide may be added; alternatively, iron sulphide may be added at a point before the air treatment and such treatment will convert the iron sulphide to iron oxide. The concentration of dissolved alkali may also be maintained by periodical additions.

The solution containing the suspension will also remove hydrocyanic acid from the gas; this may go into chemical combination with the iron compounds. Otherwise the hydrocyanic acid will pass out to some extent with the air used in the aerating step.

The purification process is carried out in the above described exemplification by means of a suspension of iron oxide in an alkaline solution. This washing mixture may be obtained by means of a number of materials which have essentially the same effect in carrying out the reactions described. Instead of iron oxide, ferric carbonate or basic ferric carbonate may be employed; or the iron may be in the form of ferric hydroxide. Ferrous compounds may also be used instead of the iron oxide, either in the form of ferrous oxide, ferrous carbonate or basic carbonate, or ferrous hydroxide; the ferrous compounds will have an action similar to the ferric oxide, and at the same time the aerating process will gradually transform them to the ferric state. The dissolved alkali may be any substance which gives an alkaline reaction to the solution, such as the carbonates of sodium and potassium, or the hydroxides of sodium and potassium; or alkaline magnesium or calcium compounds, such as magnesium hydroxide and magnesium carbonate may be added to the suspension, which have the same effect of rendering the solution alkaline.

The invention as hereinabove set forth may be variously embodied within the scope of the claims hereinafter made.

What is claimed is:

1. In a process of purifying gases containing hydrogen sulphide, the combination of steps which consists in: washing the gas with an alkaline solution containing an iron compound having an affinity for sulphur; and then passing the spent wash-liquor through a plurality of successive differing regeneration treatment stages, in the first of which a body of said liquor is subjected to a preliminary agitation accompanied by regenerating aeration and is thereafter subjected to a regenerating aeration that effects a thorough and intimate contact of air with the flowing liquor.

2. A process as claimed in claim 1, in which the alkaline solution is a sodium carbonate solution and in which the contained iron compound is iron oxide.

In testimony whereof I have hereunto set my hand.

DAVID L. JACOBSON.